United States Patent
Huang et al.

(10) Patent No.: US 9,613,278 B2
(45) Date of Patent: Apr. 4, 2017

(54) MACHINE-IMPLEMENTED METHOD AND SYSTEM FOR RECOGNIZING A PERSON HAILING A PUBLIC PASSENGER VEHICLE

(71) Applicants: An-Chi Huang, Kaohsiung (TW); Tien-Chun Huang, Kaohsiung (TW)

(72) Inventors: An-Chi Huang, Kaohsiung (TW); Tien-Chun Huang, Kaohsiung (TW)

( * ) Notice: Subject to any disclaimer, the term of this patent is extended or adjusted under 35 U.S.C. 154(b) by 0 days.

(21) Appl. No.: 14/964,741

(22) Filed: Dec. 10, 2015

(65) Prior Publication Data

US 2016/0171313 A1 Jun. 16, 2016

(30) Foreign Application Priority Data

Dec. 15, 2014 (TW) .............................. 103143701 A

(51) Int. Cl.
  *G06K 9/00* (2006.01)
  *G06Q 50/30* (2012.01)
(52) U.S. Cl.
  CPC ..... *G06K 9/00791* (2013.01); *G06K 9/00369* (2013.01); *G06K 9/00375* (2013.01); *G06Q 50/30* (2013.01)
(58) Field of Classification Search
  USPC ......................................................... 382/103
  See application file for complete search history.

(56) References Cited

U.S. PATENT DOCUMENTS

| | | | | |
|---|---|---|---|---|
| 7,983,450 | B2* | 7/2011 | Higgins ............... | G05D 1/0083 382/103 |
| 8,700,297 | B2* | 4/2014 | Matsumura ............ | G08G 1/161 701/117 |
| 9,007,481 | B2* | 4/2015 | Hasegawa .......... | G06K 9/00355 348/222.1 |
| 9,443,152 | B2* | 9/2016 | Atsmon ................. | H04N 7/185 |
| 2013/0069867 | A1* | 3/2013 | Watanabe ............... | G06F 3/017 345/156 |
| 2013/0162792 | A1* | 6/2013 | Lee ........................ | H04N 7/183 348/77 |

* cited by examiner

*Primary Examiner* — Ishrat I Sherali
(74) *Attorney, Agent, or Firm* — McNees Wallace & Nurick LLC

(57) ABSTRACT

A method is for recognizing a person hailing a public passenger vehicle. The method is implemented by a system including an image capturing device, a processor, and a notification unit. In the method, the image capturing device successively captures images in front of the public passenger vehicle at a fixed rate. The processor determines whether any one of the images has a human body. Afterwards the processor determines whether the human body remains in a predetermined posture for a predetermined duration. When it is determined that the human body remains in the predetermined posture for longer than the predetermined duration the notification unit informs a driver of the public passenger vehicle.

12 Claims, 9 Drawing Sheets

MACHINE-IMPLEMENTED METHOD AND SYSTEM FOR RECOGNIZING A PERSON HAILING A PUBLIC PASSENGER VEHICLE

CROSS-REFERENCE TO RELATED APPLICATION

This application claims priority of Taiwanese Application No. 103143701, filed on Dec. 15, 2014.

FIELD

The disclosure relates to a method and a system for recognizing a person who is hailing a public passenger vehicle.

BACKGROUND

Conventionally, a driver of a public passenger vehicle (e.g., a bus, a taxi, etc.) at work is used to constantly looking around in search of a potential customer (e.g., a person hailing at the public passenger vehicle) while driving. This may sometimes result in the driver looking away from the road and may be a potential source of dangerous driving and/or driving accident.

SUMMARY

Therefore, an object of the disclosure is to provide a machine-implemented method that can automatically recognize a person in front of a public passenger vehicle hailing the same.

According to the disclosure, the method is to be implemented by a system. The system includes an image capturing device disposed at the public passenger vehicle, a processor coupled to the image capturing device, and a notification unit coupled to the processor. The method includes the steps of:

successively capturing, by the image capturing device, images in front of the public passenger vehicle at a fixed rate;

for each of the images,
determining, by the processor, whether the image contains a human body, and
when it is determined that the image contains a human body, determining, by the processor, whether the human body is in a predetermined posture;

when it is determined that the human body in one of the images is in the predetermined posture, determining, by the processor, whether the human body is in the predetermined posture in a predetermined number of successive ones of the images so as to determine whether the human body remains in the predetermined posture for a predetermined duration; and when it is determined that the human body remains in the predetermined posture for longer than the predetermined duration, informing, by the notification unit, a driver of the public passenger vehicle of the presence of a person in front of the public passenger vehicle and hailing the same.

Another object of the disclosure is to provide a system that is configured to implement the above-identified method.

According to one embodiment of the disclosure, the system is for recognizing a person hailing a public passenger vehicle, and includes an image capturing device, a processor, and a notification unit.

The image capturing device is disposed at the public passenger vehicle. The image capturing device is programmed to successively capture images in front of the public passenger vehicle at a fixed rate.

The processor is coupled to the image capturing device, and is programmed to:

for each of the images,
determine whether the image contains a human body, and
when it is determined that the image contains a human body, determine whether the human body is in a predetermined posture; and when it is determined that the human body is in the predetermined posture, determine whether the human body is in the predetermined posture in a predetermined number of successive ones of the images so as to determine whether the human body remains in the predetermined posture for a predetermined duration.

The notification unit is coupled to the processor, and is controlled by the processor to inform a driver of the public passenger vehicle about the presence of a person in front of the public passenger vehicle and hailing the same when it is determined that the human body remains in the predetermined posture for longer than the predetermined duration.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
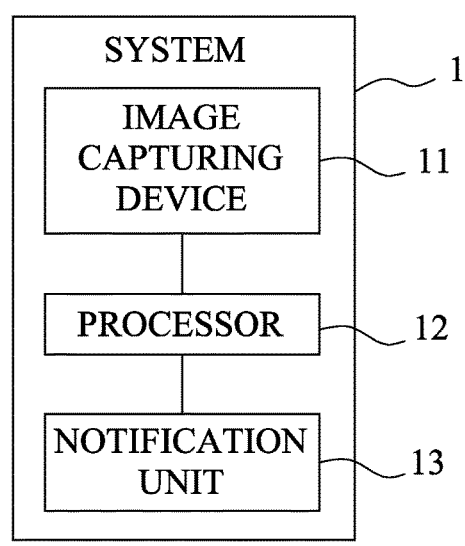
FIG. 1 is a block diagram illustrating a system for recognizing a person hailing a public passenger vehicle, according to one embodiment of the disclosure.

FIG. 1 illustrates a system 1 for recognizing a person hailing a public passenger vehicle, according to one embodiment of the disclosure. In this embodiment, the public passenger vehicle (not shown) may be a bus, a taxi, etc.

The system 1 is installed in the public passenger vehicle, and includes an image capturing device 11, a processor 12, and a notification unit 13.

The image capturing device 11 may be embodied using a video camera, and may be mounted on a front part of the public passenger vehicle so as to capture images in front of the public passenger vehicle successively. In this embodiment, the image capturing device 11 captures images at a fixed rate (e.g., 24 images per second).

The processor 12 is electrically connected to the image capturing device 1 and the notification unit 13, and is configured to perform an analysis on each of the images captured by the image capturing device 11, and to determine whether any one of the images contains a human body.

When it is determined that one of the images contains a human body, the processor 12 then determines whether the human body is in a predetermined posture. When it is determined that the human body is in the predetermined posture, the processor 12 then determines whether the human body is in the predetermined posture in for a predetermined duration (i.e., indicating that there is a person in front of the public passenger vehicle, hailing the same).

When it is determined that the human body remains in the predetermined posture for longer than the predetermined duration, the processor 12 controls the notification unit 13 to inform a driver of the public passenger vehicle about presence of a person in front of the public passenger vehicle and hailing the same.

It is noted that in this embodiment, operations done by the processor 12 (e.g., detecting human body, detecting postures, etc.) may be realized by the processor 12 executing an application. The application may be developed using the Kinect for Windows Software Development Kit (SDK) 2.0, provided by Microsoft Corporation.

Figure 2:
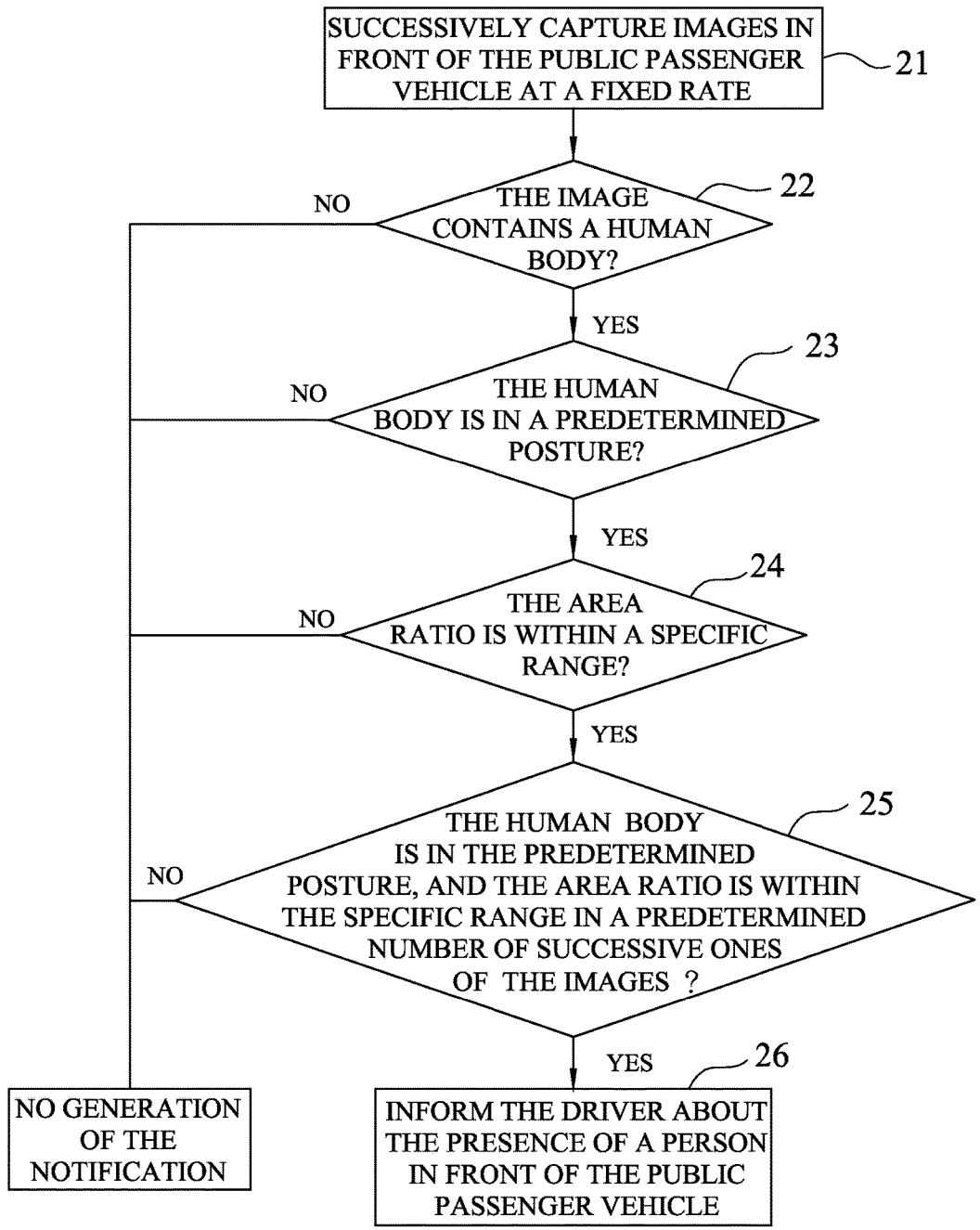
FIG. 2 is a flow chart illustrating steps of a method for recognizing a person hailing a public passenger vehicle, according to one embodiment of the disclosure.

FIG. 2 illustrates steps of a method for recognizing a person hailing the public passenger vehicle implemented by the system 1, according to one embodiment of the disclosure.

In step 21, the image capturing device 11 successively captures images in front of the public passenger vehicle at a fixed rate.

Figure 3:
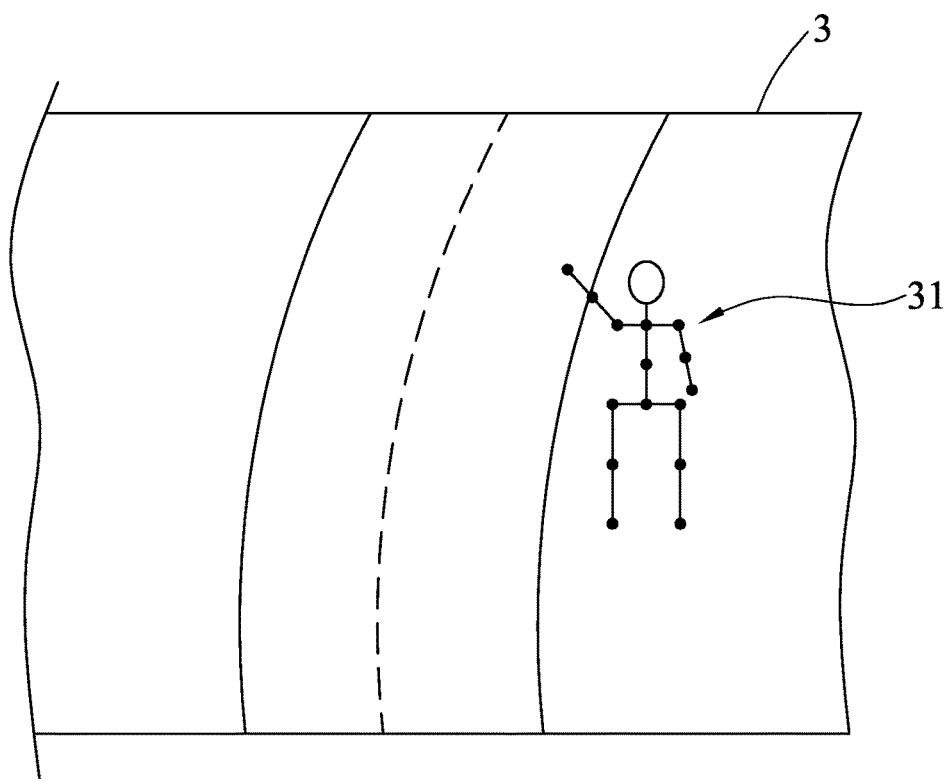
FIG. 3 illustrates an image that is captured by an image capturing device, according to one embodiment of the disclosure.

In step 22, the processor 12 performs an analysis on each of the images captured by the image capturing device 11 to determine whether the image contains a human body. FIG. 3 illustrates an exemplary image 3, which contains a detected human body 31.

When it is determined that the image contains a human body, the process goes to step 23, in which the processor 12 determines whether the human body is in a predetermined posture.

Figure 4:
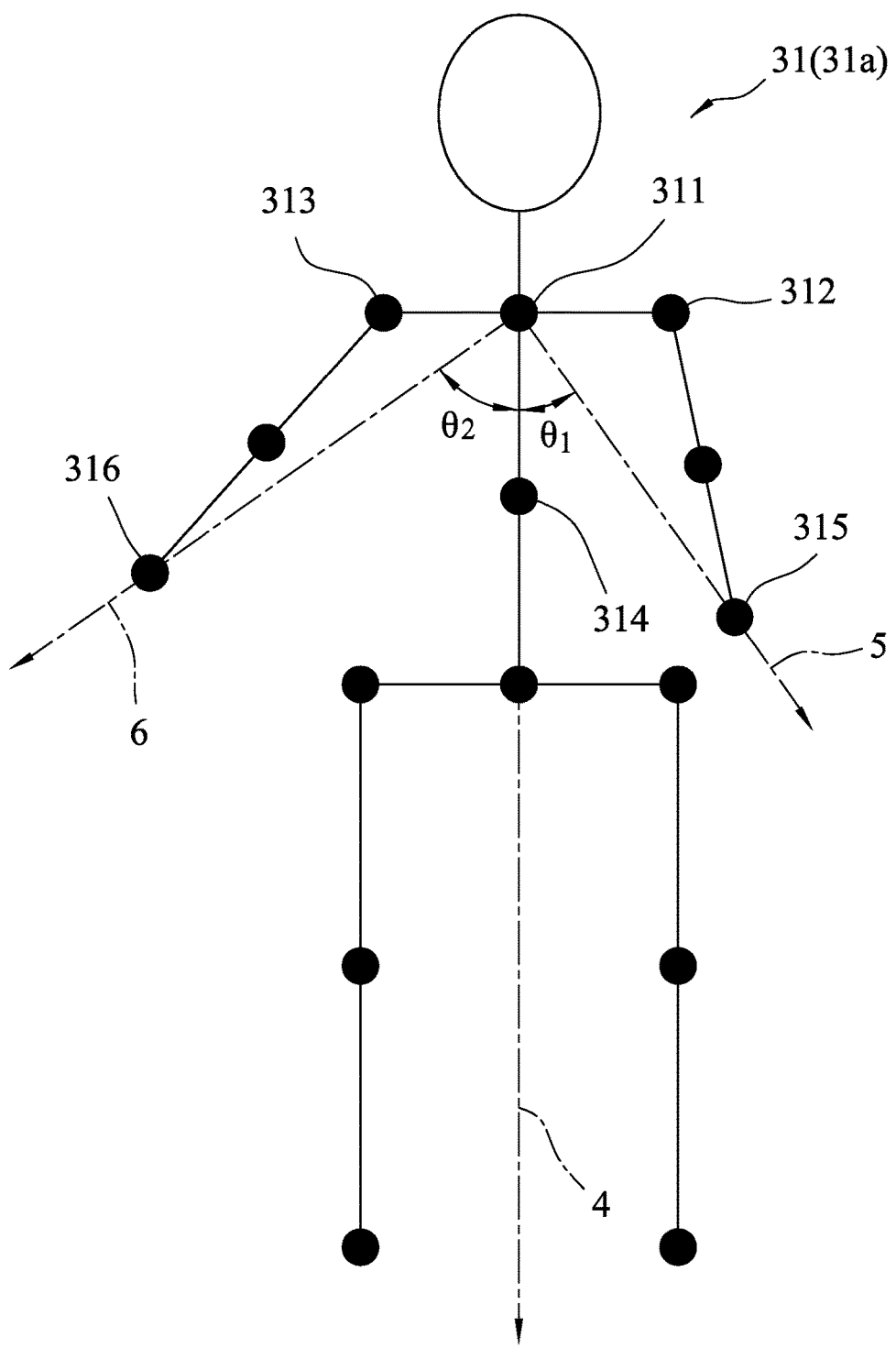
FIGS. 4 to 7 illustrate human bodies detected in images captured by the image capturing device, each having different postures.
Figure 5:
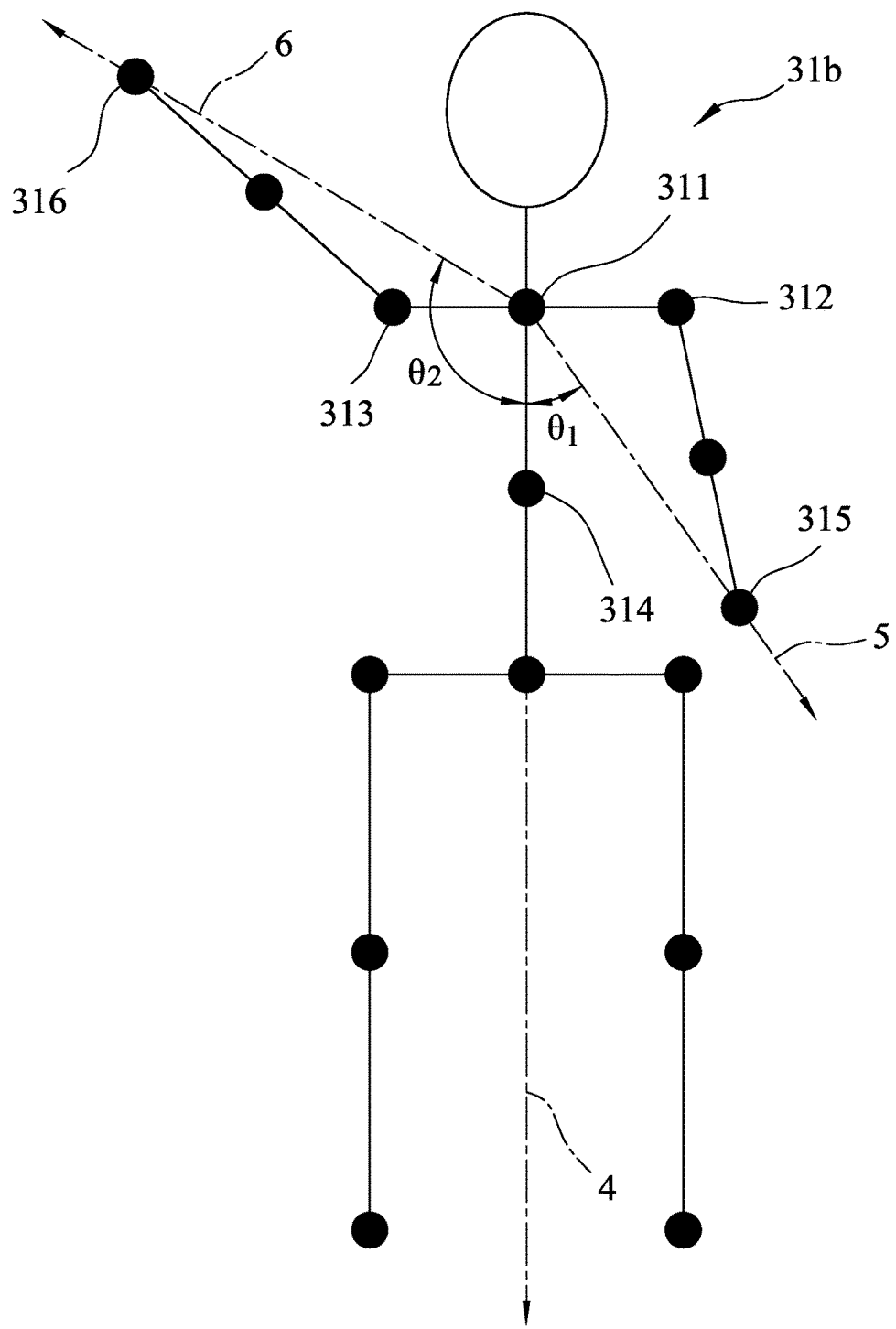
Figure 6:
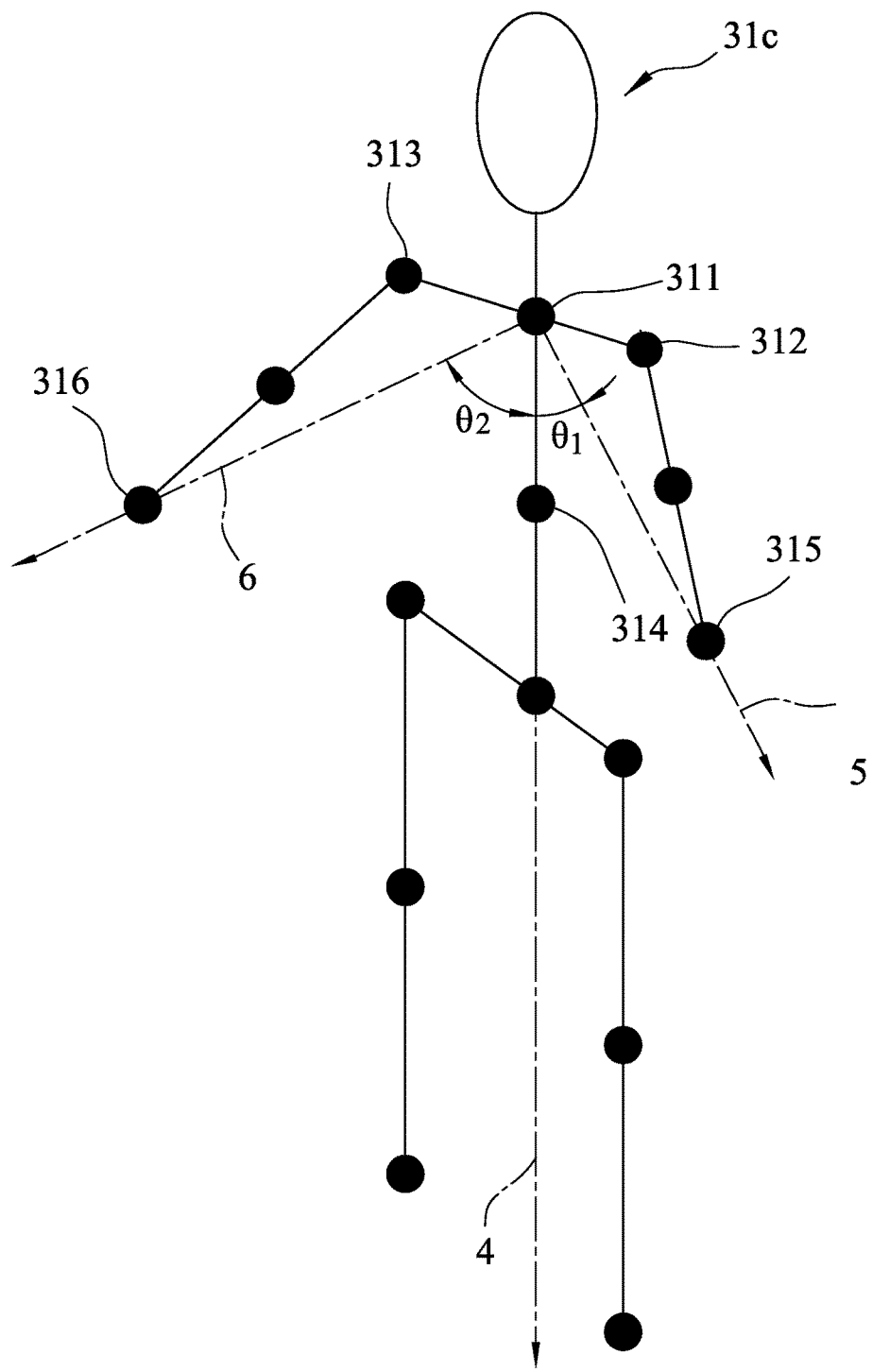
Figure 7:
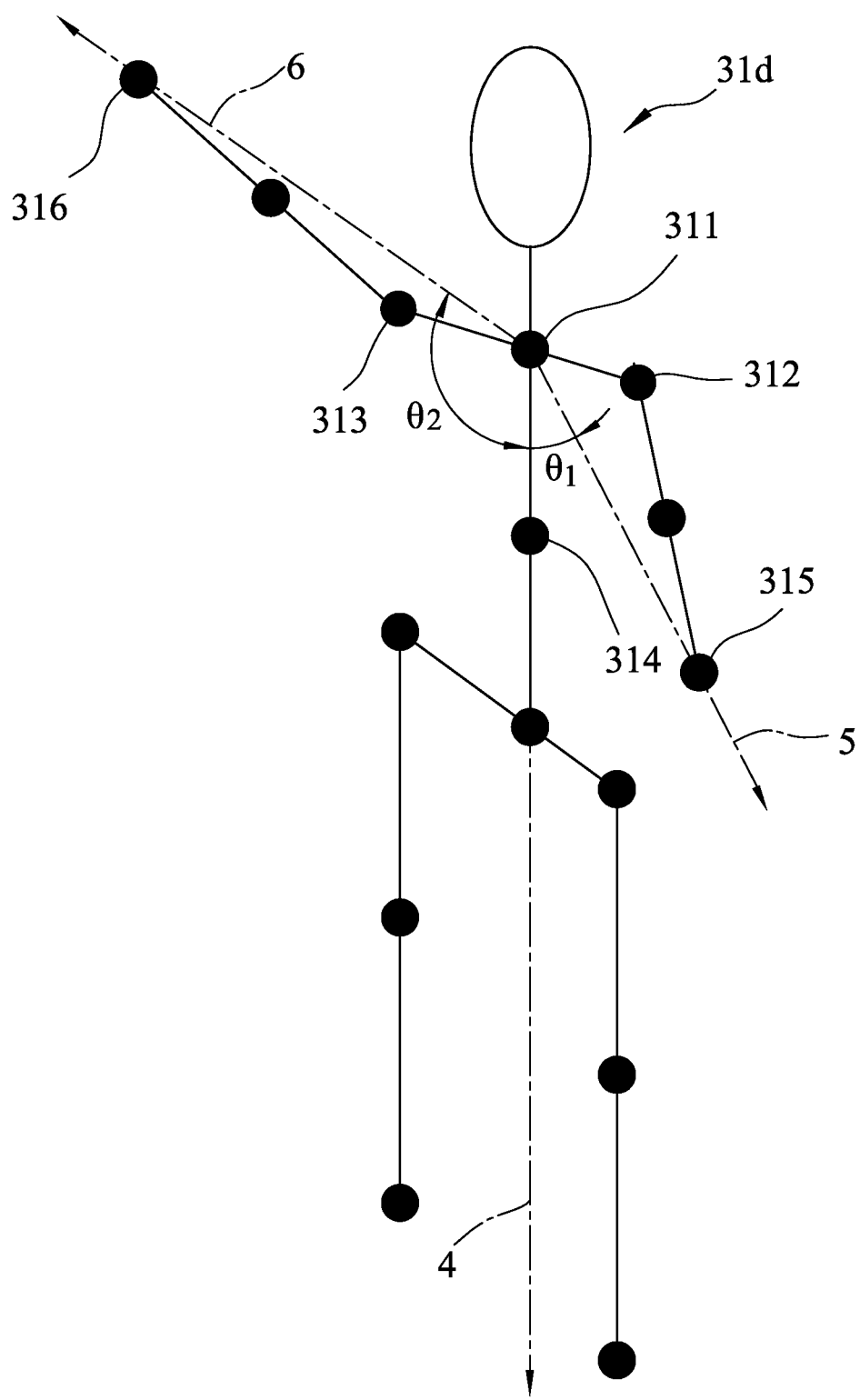

Specifically, as shown in FIG. 4, the processor 12 is programmed to detect parts of the human body 31. That is, the processor 12 detects a neck part 311, a spine part 314, a left palm part 315, and a right palm part 316 of the human body 31.

Furthermore, the processor 12 determines a first imaginary line 4 extending through the neck part 311 and the spine part 314, a second imaginary line 5 extending through the neck part 311 and the left palm part 315, and a third imaginary line 6 extending through the neck part 311 and the right palm part 316.

Using the three imaginary lines 4, 5, 6, the processor 12 then calculates a first included angle ($\theta_1$) defined by the first imaginary line 4 and the second imaginary line 5, and a second included angle ($\theta_2$) defined by the first imaginary line 4 and the third imaginary line 6.

The two included angles ($\theta_1, \theta_2$) indicate whether a person (shown in the image 3 as the human body 31) is waving one or more of his/arms. In this embodiment, the processor 12 determines that the human body 31 is in the predetermined posture when a greater one of the first included angle ($\theta_1$) and the second included angle ($\theta_2$) is larger than a threshold value (e.g., 30 degrees).

Using this standard, each of the human bodies 31a to 31d having various gestures as illustrated in FIGS. 4 to 7 are determined by the processor 12 as conforming with the predetermined posture, respectively, because for each of the human bodies 31a to 31d, the greater one of the first included angle ($\theta_1$) and the second included angle ($\theta_2$) is larger than 30 degrees.

In another embodiment, a different standard may be applied for determining whether the human body 31 is in the predetermined posture. Specifically, the processor 12 detects the left palm part 315, the right palm part 316, and additionally a left shoulder part 312, and a right shoulder part 313 of the human body 31. Afterward, the processor 12 determines that the human body 31 is in the predetermined posture when at least one of the left palm part 315 and the right palm part 316 is above both the left shoulder part 312 and the right shoulder part 313.

Using this standard, the human bodies 31a to 31d having various gestures as illustrated in FIGS. 4 to 7 may not be all determined by the processor 12 as conforming with the predetermined posture. For example, for the human bodies 31a and 31c, neither the left palm part 315 nor the right palm part 316 is above the left shoulder part 312 and the right shoulder part 313.

After operations of step 23 have been performed, the flow proceeds to step 24 when it is determined that the human body 31 is in the predetermined posture.

Figure 8:
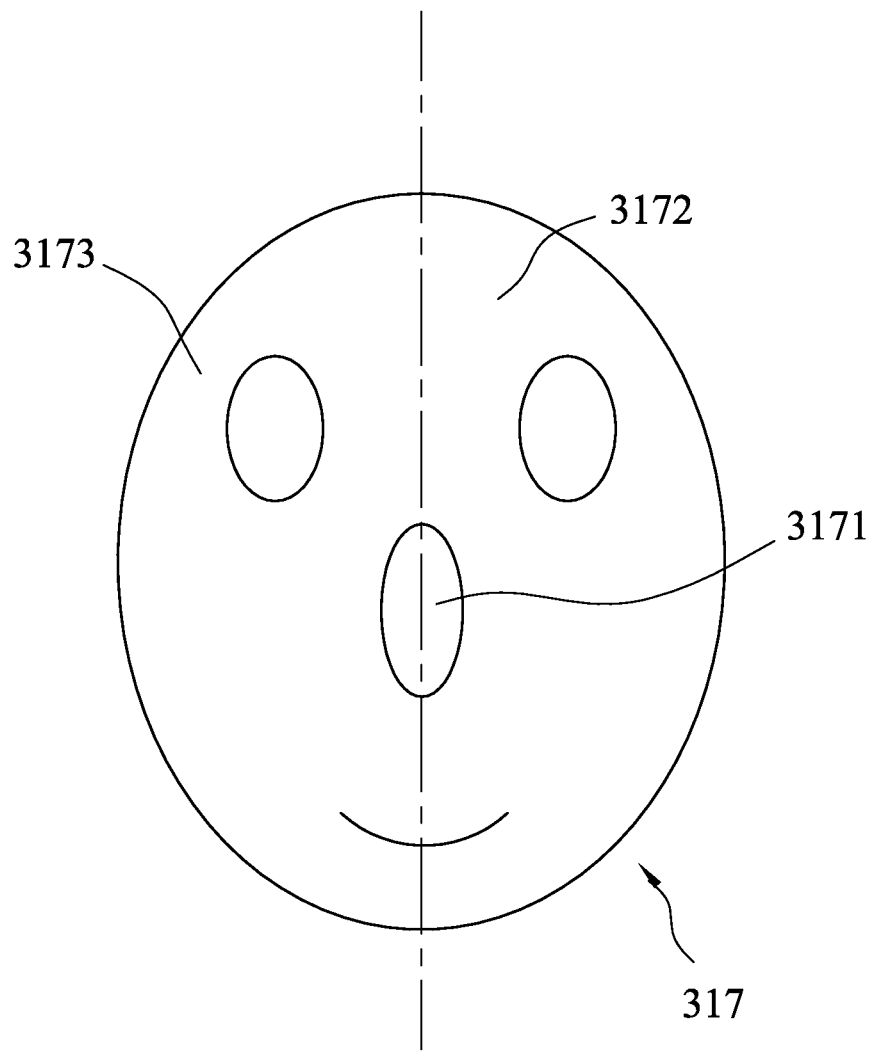
FIGS. 8 and 9 each illustrate a face part of the human body.
Figure 9:
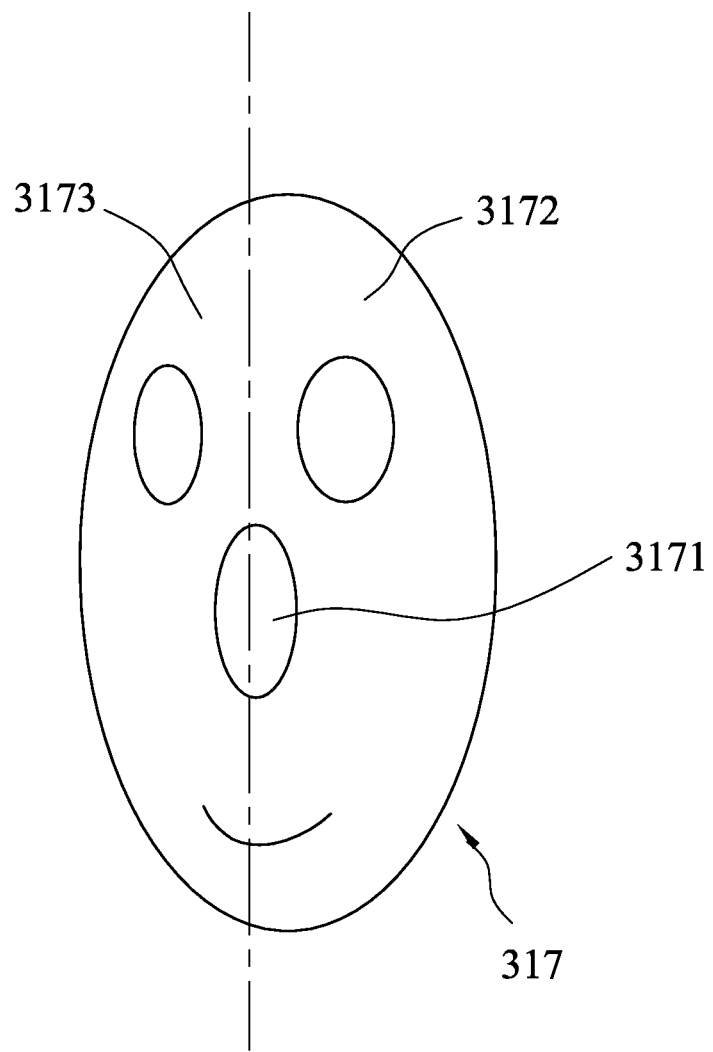

In step 24, the processor 12 is further programmed to detect a face part 317 of the human body 31, a left-face portion 3172 of the face part 317, and a right-face portion 3173 of the face part 317 (see FIGS. 8 and 9). Detection of a nose portion 3171 of the face part 317 may assist in the detection of the left- and right-face portions 3172, 3173.

Furthermore, the processor 12 calculates an area for the left-face portion 3172 and the right-face portion 3173. Then the processor 12 calculates an area ratio of a bigger one of the left-face portion 3172 and the right-face portion 3173 to a smaller one of the left-face portion 3172 and the right-face portion 3173.

When it is determined that the area ratio is within a specific range (1 to 1.5 in this embodiment), the flow proceeds to step 25.

In step 25, the processor 12 determines whether the human body 31 is in the predetermined posture and the area ratio is within the specific range in a predetermined number of successive ones of the images. For example, if the image capturing device 11 captures images at the rate of 24 images per second, when successive 48 images all indicate that the human body 31 is in the predetermined posture and the area ratio is within the specific range, the processor 12 may determine that the human body 31 maintains the same posture for 2 seconds.

When it is determined that the human body 31 has been in the predetermined posture and the area ratio has stayed within the specific range for longer than a predetermined duration (e.g., 2 to 15 seconds in this embodiment), the flow goes to step 26, where the processor 12 controls the notification unit 13 to inform the driver about the presence of a person in front of the public passenger vehicle and hailing the same. For example, the notification unit 13 may generate an audible alert to notify the driver that there is a person in front of the public passenger vehicle and hailing the same. In another embodiment, the notification unit 13 may produce a flashing signal.

To sum up, the method and system as described in the disclosure may provide a way for informing the driver of the existence of a potential customer, specifically, by capturing images in front of the public passenger vehicle and performing analysis on the images. As a result, the driver may be notified of the potential customer without having to look away from the road.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for recognizing a person hailing a public passenger vehicle, the method to be implemented by a system that includes an image capturing device disposed at the public passenger vehicle, a processor coupled to the image capturing device, and a notification unit coupled to the processor, the method comprising the steps of:
successively capturing, by the image capturing device, images in front of the public passenger vehicle at a fixed rate;
for each of the images,
determining, by the processor, whether the image contains a human body, and
when it is determined that the image contains a human body, determining, by the processor, whether the human body is in a predetermined posture;
when it is determined that the human body in one of the images is in the predetermined posture, determining, by the processor, whether the human body is in the predetermined posture in a predetermined number of successive ones of the images so as to determine whether the human body remains in the predetermined posture for a predetermined duration; and
when it is determined that the human body remains in the predetermined posture for longer than the predetermined duration, informing, by the notification unit, a driver of the public passenger vehicle about the presence of a person in front of the public passenger vehicle and hailing the same.

2. The method of claim 1, further comprising the step of determining, by the processor, whether an area ratio of a bigger one of a left-face portion and a right-face portion of the human body to a smaller one of the left-face portion and the right-face portion is within a specific range,
wherein the step of informing the driver about the presence of a person in front of the public passenger vehicle and hailing the same is performed when it is determined that the human body has been in the predetermined posture and the area ratio has been within the specific range for longer than the predetermined duration.

3. The method of claim 2, wherein the specific range is 1 to 1.5.

4. The method of claim 1, wherein, in the step of determining whether the human body is in the predetermined posture, the processor is programmed to:
detect a neck part, a spine part, a left palm part, and a right palm part of the human body;
determine a first imaginary line extending through the neck part and the spine part, a second imaginary line extending through the neck part and the left palm part, and a third imaginary line extending through the neck part and the right palm part;
determine a first included angle defined by the first imaginary line and the second imaginary line, and a second included angle defined by the first imaginary line and the third imaginary line; and
when a greater one of the first included angle and the second included angle is larger than a threshold value, determine that the human body is in the predetermined posture.

5. The method of claim 4, wherein the threshold value is 30 degrees.

6. The method of claim 2, wherein, in the step of determining whether the human body is in the predetermined posture, the processor is programmed to:
detect a left palm part, a right palm part, a left shoulder part, and a right shoulder part of the human body; and
determine that the human body is in the predetermined posture when at least one of the left palm part and the right palm part is above both the left shoulder part and the right shoulder part.

7. A system for recognizing a person hailing a public passenger vehicle, said system comprising:
an image capturing device disposed at the public passenger vehicle, said image capturing device being programmed to successively capture images in front of the public passenger vehicle at a fixed rate;
a processor coupled to said image capturing device, said processor being programmed to
for each of the images,
determine whether the image contains a human body, and
when it is determined that the image contains a human body, determine whether the human body is in a predetermined posture, and
when it is determined that the human body in one of the images is in the predetermined posture, determine whether the human body is in the predetermined posture in a predetermined number of successive ones of the images so as to determine whether the human body remains in the predetermined posture for a predetermined duration; and
a notification unit coupled to said processor, said notification unit being controlled by said processor to inform a driver of the public passenger vehicle about the presence of a person in front of the public passenger vehicle and hailing the same when it is determined that the human body remains in the predetermined posture for longer than the predetermined duration.

8. The system of claim 7, wherein:
said processor is further programmed to determine whether an area ratio of a bigger one of a left-face portion and a right-face portion of the human body to a smaller one of the left-face portion and the right-face portion is within a specific range; and
when it is determined that the human body has been in the predetermined posture and the area ratio has been within the specific range for longer than the predetermined duration, said processor controls said notification unit to inform the driver of the presence of a person in front of the public passenger vehicle and hailing the same.

9. The system of claim 8, wherein the specific range is 1 to 1.5.

10. The system of claim 7, wherein, in determining whether the human body is in the predetermined posture, said processor is programmed to:
detect a neck part, a spine part, a left palm part, and a right palm part of the human body;
determine a first imaginary line extending through the neck part and the spine part, a second imaginary line extending through the neck part and the left palm part, and a third imaginary line extending through the neck part and the right palm part;
determine a first included angle defined by the first imaginary line and the second imaginary line, and a second included angle defined by the first imaginary line and the third imaginary line; and
when a greater one of the first included angle and the second included angle is larger than a threshold value, determine that the human body is in the predetermined posture.

11. The system of claim 10, wherein the threshold value is 30 degrees.

12. The system of claim 8, wherein, in determining whether the human body is in the predetermined posture, the processor is programmed to:
   detect a left palm part, a right palm part, a left shoulder part, and a right shoulder part of the human body; and
   determine that the human body is in the predetermined posture when at least one of the left palm part and the right palm part is above both the left shoulder part and the right shoulder part.

* * * * *